April 21, 1953 — F. W. CHRISWELL — 2,635,556
HIGH STAKE LOG BUNK

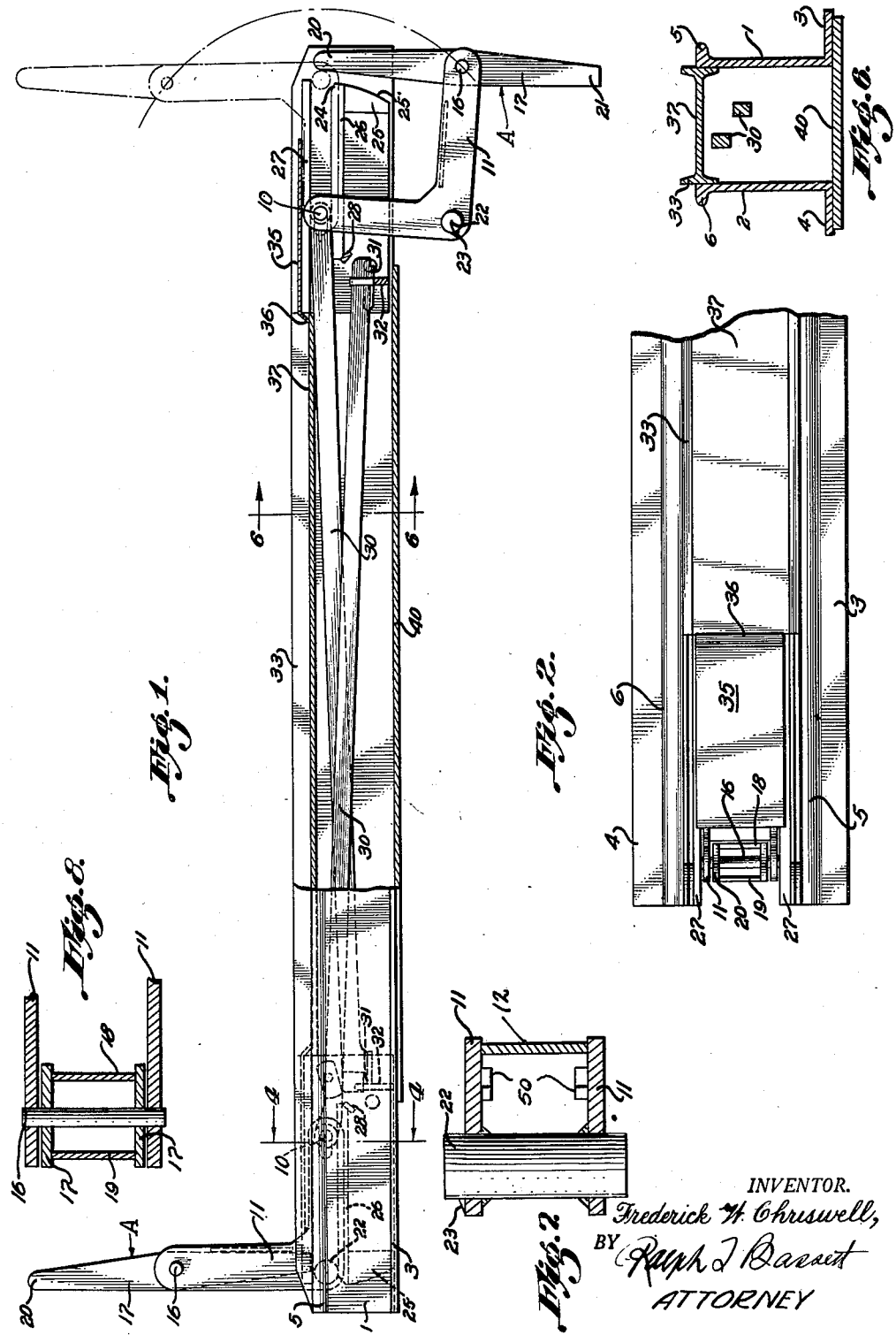

Filed July 2, 1948 — 2 SHEETS—SHEET 2

INVENTOR.
Frederick W. Chriswell,
BY Ralph T. Bassett
ATTORNEY

Patented Apr. 21, 1953

2,635,556

UNITED STATES PATENT OFFICE 2,635,556

HIGH STAKE LOG BUNK

Frederick W. Chriswell, Seattle, Wash., assignor to Pacific Car and Foundry Company, Renton, Wash.

Application July 2, 1948, Serial No. 36,633

19 Claims. (Cl. 105—160)

This invention relates to log bunks of the high stake type and is an improvement on my prior Patent No. 2,382,002, dated August 14, 1945.

The primary object of this invention is to develop a high stake log bunk of basically conventional design and suitable for use in lieu of or as a substitute for the usual low stake type log bunk, the present adaptation permitting a movement of the stake to its full height to facilitate maximum loading and increased protection against lateral displacement of the load.

One of the main objects of the invention is to provide an operating mechanism for the stake including a bell crank structure, one arm of which is bifurcated and moves with and assumes a position with the bifurcated parts parallel to and at each side of the stake to retain the same in a rigid locked position.

Another object of the invention is to provide a high stake type bunk in which the stakes when in upright position are substantially enclosed and fully protected below their pivot point, the stakes being moved to and retained in their vertical position by locking means, which latter is capable of release at the opposite end of the bunk relative to which the stake to be released is positioned.

A further object is to provide an assembly in which the stake in the lower position is shielded by the bunk structure, and maintained in vertical position by a counterweight.

Other objects of this invention will more clearly hereinafter appear by reference to the accompanying drawings and specification wherein like characters of reference designate corresponding parts throughout the several views, in which:

Figure 1 is a side elevation partly in section, showing one stake in lowered position and the other stake in elevated position;

Figure 2 is a fragmentary top plan view of the invention;

Figure 6 is a transverse section on line 6—6 of Figure 1;

Figure 7 is a transverse section on line 7—7 of Figure 5; and

Figure 8 is a transverse section on line 8—8 of Figure 5.

Figure 5:
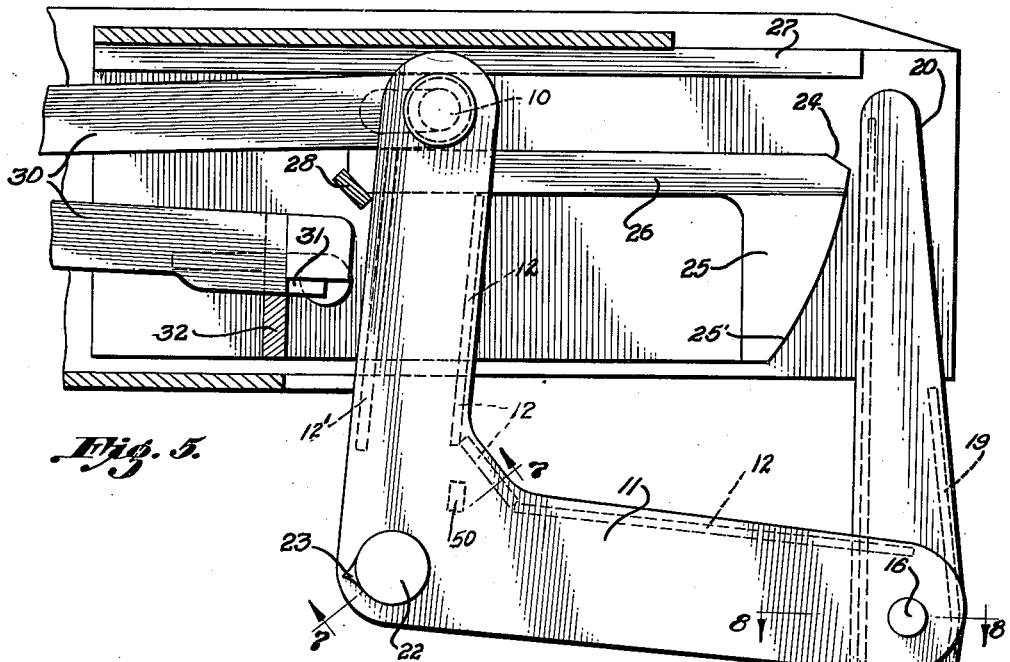
Figure 5 is an enlarged section through the end of a bunk showing the stake and its operating mechanism in position when the stake is lowered.
Figures 3, 4:
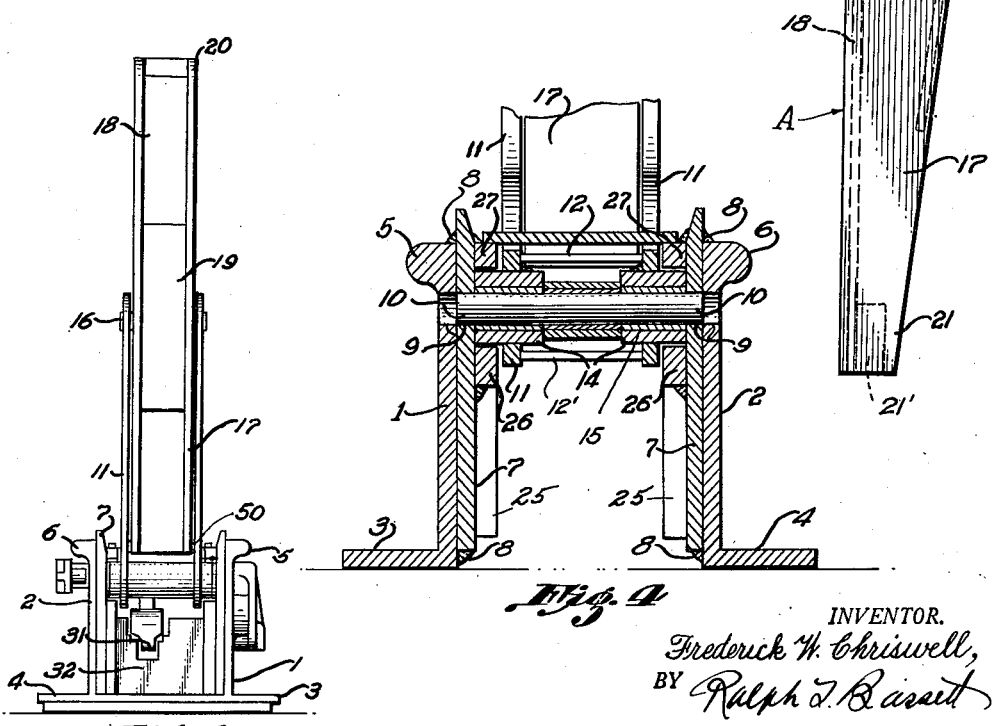
Figure 3 is an end elevation showing a stake in its upper position.
Figure 4 is a transverse section on line 4—4 of Figure 1.

As stated, the main bunk structure is generally in accordance with and of the type shown in my prior Patent No. 2,382,002 and comprehends a bolster, including side walls 1 and 2. These walls may be flanged horizontally and extended outward at their lower edges 3 and 4 to provide a footing or base, and the upper marginal edges of the side walls may be beaded as at 5 and 6 in the nature of a bulb flange to add to the rigidity of the structure. The side walls 1 and 2 of the main bunk extend from end to end of the bunk assembly and the end portions are reinforced by the spaced vertical side walls 7 of the end filler assembly. These vertical side walls 7 of the end filler assemblies are each preferably welded at their top and bottom as indicated at 8 to the side walls 1 and 2 and project above the beaded flanges 5 and 6 of these walls 1 and 2 as more clearly shown in Figure 4. The vertical walls 7 of the end fillers and side walls 1 and 2 of the main bunk are each pierced to form aligned openings 9, the openings in the walls 7 being elongated as shown to form horizontal sockets for the pins 10 and these pins are adapted to move in the elongated openings 9 formed in the side walls 7 of the filler in a horizontal plane to the extent permitted by the elongated nature of the openings, as best shown in Figure 5. Upon the pins 10 are mounted the main stake assemblies 11 of bell crank form shown in detail in Figure 5, these bell crank members being of substantially right angle form with one leg operating as the main stake element and the other leg as the control therefor to maintain the main stake portion vertical during use and through suitable operating mechanism to lower the same together with auxiliary stake extensions. These parts may be cast in one piece or formed as shown of spaced flat elements and connected together by transverse intermediate stays 12 extending from wall to wall adjacent the marginal edge of the structure. One end portion of each side wall of the main stakes 11 is fixed to a tubular sleeve 14, the latter having lining or bearing 15 for pivotal movement on the pins 10. The free or outer ends of the bell crank structures 11 have transverse pivot pins 16 which pierce the auxiliary stakes A substantially medially of their length and provide pivotal mountings for these auxiliary stake elements.

Each of the auxiliary stake elements A is fabricated as shown to include the side walls 17 connected at their rear marginal edges by the connecting plate 18 and at the front edge for the greater portion of their central structure by the connecting plate 19. The outer or front edge of the stake has inclined faces 20 and 21 which extend from the widened central portion of the stake to the reduced end portion.

At the angle of each bell crank arm of the main stake structure which supports the stakes are cross pins 22, these pins each being formed with V-shaped lateral extensions 23 which may extend throughout the longitudinal length of the pins 22 and are constructed and arranged to engage the angular faces 24 of the lower guide plate structures 25—26 which are fixed to the inner faces of the side walls 7 of the filler assembly. The lower guide plates include elongated shank portions 26 and depending outer projections 25, the latter having outer curved faces 25' as best shown in Fig. 5, for association with the cross pins 22 as the latter swing downwardly with the main stake 11. It will be noted that the diagonal faces 24 of the lower guides, which cooperate with the V-projections 23 to seat the latter when the main stake 11 is in its upper position, are formed by shearing the guide plates diagonally at their upper and outer corners 24. The shanks 26 of the guide plates which are fixed by welding or otherwise to the inner faces of the side walls 7 of the filler assembly are arranged with their upper faces in a horizontal plane and these faces are spaced from and lie parallel to the upper guide rails or bars 27 which are likewise welded or otherwise secured to the inner faces of the side walls 7 of the filler assembly along the upper marginal edges thereof. The inner ends of the shanks 26 project inwardly to a point immediately adjacent the fixed cross member 28, which extends between walls 7 and forms a fulcrum for movement of one arm of the main stake 11 when the latter is either raised or lowered. The cross member 28 is tilted at an angle to the perpendicular and inherently forms a bracing structure for the spaced walls with which it is connected. Upper guide rails or bar 27 are positioned above and in horizontal spaced relation to the guides 26 and define a path of movement for the operating pin 10. The cross member 28 extends between the vertical side walls 7 of the end filler at the inner ends of the guide rails 26 and abuts against the inner angular faces of the guide rails 26 to form in association therewith a stop element for determining the movement of the bell crank members, and to force the operating bar forward when released. Pivoted operating arms 30 are connected to each pivot pin 10 and extend between the spaced walls of the bolster, these operating arms being formed with depending lugs 31 which engage notches formed in the transverse lock plates 32 in accordance with the invention disclosed in my prior patent. The space between the top of the side walls of the bolster is connected by I-beams 37, these I-beams having flanges 33 extending above the side plates 1 and 2 of the bunk body and having their top edges flush with the upper edges of the projecting vertical plates 7 of the end fillers at the ends of the bolster structure. Sealing plates 35 overlie each end of the filler block assembly including those parts confined by the filler plates and representing the operating structure, these sealing plates having inner lips 36 which project downward and connect with the inner web 37 of the intermediate connecting I-beam 33. A bottom sheet 40 extends across the base of the side walls 1 and 2 of the bolster body, sealing the bolster assembly at points intermediate the inserts, the space between the I-beams 33 and the inserts being left open to permit swinging movement of the bell cranks 11 forming the main stakes which carry the stakes from operative to inoperative position. The bolster body is also open at its end, this arrangement being necessary because of the limited outward swinging movement of the auxiliary A stakes on their control bell crank levers, it being obvious by an inspection of the structure that these stakes A are so constructed and arranged that during their movement they will extend beyond the ends of the side walls, but will maintain a vertical position on account of the lower end being heavier or counterweighted by weight member 21'.

It will be noted that the vertical plates 7 of the end fillers and lower guide members 25—26 can be fabricated as a unit with the cross bar or stop 28 fixed at the inner ends of these bars in their spaced position so that they may be inserted and fixed in position with a minimum amount of difficulty and expenditure.

It will also be noted that the plates 25—26 which form the guides for the bell crank and stakes are formed with curved faces 25' at their outer ends, these curved faces corresponding to an arc, the center of which is represented by the axis of the pivot pin 10 when in its outer position in its elongated guideways. The upper position of the stake is determined by the seating engagement of the pin 22 on the angle faces 24 of the guide members 25—26 when the inner arm of the bell crank has moved to a horizontal position and the pivot pin 10 is moved inwardly in the guide slot 9. In the upright position of the main stake the outer bell crank arm or main stake element is vertical and encloses the lower portion of the auxiliary stake A, the pin projection 23 seating on the inclined shoulder 24. This seating of the bell crank is brought about by the inward movement of the pin 10 in its guide slots.

It will be noted that the bell crank lever 11 has its outer free arm provided with the connecting reinforcing plates 12 only at the inner part of the structure, while the inner arm of the bell crank lever has the reinforcing connecting plates not only at the inner side of the structure as shown at 12, but also at the outer side as at 12'. This arrangement is necessary in order that the space between the side plates of the outer arm of the bell crank may be clear to provide a pocket in which the lower portion of the auxiliary stake A is positioned and secured against further movement when in its upper position as shown at the left side of Figure 1. The pivot pin 16 connecting the spaced walls of stake A and the crank arm 11 while arranged generally medially of the stake structure is not exactly in the center as the upper portion of the stake may be longer than the lower portion, as this lower portion must be of such a length as to be received within and between the spaced walls of the outer crank arm portion 11 as shown more clearly in Figure 3. The lower end of the stake must be counterweighted or heavier than the upper end as by counterweight 21'. It will be noted that at the elbow of the bell crank 11 there are inwardly projecting stop or guide members 50 which cooperate with the bottom end of the stake A when the latter is fully elevated, in which position the lower end of the stake is enclosed between the side plates of the bell crank assembly. Thus when the auxiliary stake A is in elevated position it is snugly housed and braced against displacement and is locked in the upper position by the control locking arms 30 which engage and lock in association with the transverse plates 32. This construction is conventional as disclosed by applicant's prior patents such as Patent No. 1,224,276 of May 1, 1917.

In the operation of the present stake structure, each stake is operated from a position at the opposite end of the bunk structure, this operating means being somewhat conventional and consisting of the locks and lock plates 30, 31 and 32, respectively. The movement of the control arm 30 connected to either of the stake assemblies will release the stake and when the stake is raised to its elevated position will lock it in that position, the movement of the arm shifting the cross pin 10 and the bell crank 11 swinging vertically on the cross member 28 as the fulcrum. During the swinging movement of the main stake or bell crank 11 the connecting pin 22 contacts and travels along the guide face 25' until the projection 23 is seated upon the angular face of the faces 24 of the guide rails 26 in which position the locks on the arm 30 are in position to engage the lock plates 32 to retain the bell crank in its upper supported position with the stake vertical. This movement of the bell crank main stake 11 results in the auxiliary stake A moving in a vertical plane owing to its lower end being counterweighted until its lower end portion is confined between the walls of the outer end of the main stake or bell crank 11 which outer end of the bell crank assumes the position above the upper face of the guide rails 26. The lower end of the stake A engages the stop members 50 and is prevented from moving inwardly out of vertical alignment. The side walls of the main stake crank arms or bell crank lever 11 prevents lateral movement or lateral displacement of the auxiliary stakes A when in their upper position, which is the position in which they are placed under load.

When the stake is in operating position should a swinging load strike the top of the stake it will move inwardly, turning on its pivot 16, but will drop back into position owing to its counterweight.

I claim:

1. A bunk including a body formed of spaced side walls and a connecting base, a filler arranged within each end of said bunk between said spaced side walls, said filler including vertical walls fixed to the inner faces of the side walls of said body, longitudinally extending transversely aligned guide slots formed in the vertical walls of said fillers, a pivot pin arranged to travel in each pair of guide slots, spaced parallel guide rails fixed to the inner face of each vertical wall of each filler above and below said elongated slots, the lower guide rails each including at its outer end a depending portion having an arcuate outer guide face, said guide faces each having as its center the axis of said pivot pin when the latter is in the outer end of its slot, and stake mechanism for each end of said bunk, said stake mechanism including a bell crank lever pivotally mounted at one end on one of said pivot pins, a stake pivoted medially to the other end of each bell crank lever, a guide pin carried medially of each bell crank and adapted to contact each guide face during its upward movement as said bell crank swings on its pivot, a support for the medially arranged guide pin of said bell crank for receiving said guide pin when said pivot pin has been shifted, and means for locking said stake mechanism against lateral displacement when said guide pin is positioned on its support.

2. A bunk including a body formed of spaced side walls and a connecting base, a filler arranged within each end of said bunk between said spaced walls, said filler including vertical walls fixed to the inner side walls of said body, longitudinally extending transversely aligned slots formed in the vertical walls of said fillers, a pivot pin arranged to travel in each pair of guide slots, spaced parallel guide rails fixed to the inner face of each vertical wall of each filler above and below said elongated slots, arcuate guide members arranged at the ends of the lower guide rails, said arcuate guide members having their contour defined by an axis determined by the longitudinal center of said pivot pins when the latter are arranged in the outer ends of their slots, a stop bar extending between the vertical walls of said filler and arranged below said aligned slots, and a stake mechanism for each end of said bunk, said stake mechanism including a bell crank lever pivotally mounted at one end on one of said pivot pins, a stake medially pivoted to the other end of each bell crank lever, a guide pin carried medially of each bell crank and adapted to contact said arcuate guide members during its upward movement as said bell crank swings on its pivot, means for supporting said guide pin at the end of the movement of said bell crank, and means for locking said stake mechanism against lateral displacement when said guide pin is positioned on its support.

3. A bunk including a body formed of spaced side walls and a connecting base, a filler arranged in an end of said bunk between said spaced side walls, said filler including vertical walls abutting the inner faces of the side walls of said body, longitudinally extending transversely aligned elongated slots formed in the vertical walls of the filler, a pivot pin arranged to travel in said guide slots, spaced parallel guide members above and below said elongated slots, the lower guide portions each including a downwardly extending outer end including an arcuate outer guide face, said arcuate guide faces having as their center the axis of said pins when in the outer end of said slots, a bell crank lever pivotally mounted at one end on each pin, a stake medially pivoted on the other end of each bell crank lever, a guide pin carried medially of each bell crank lever and adapted to contact said arcuate guide face during upward movement of said bell crank on its pivot pin, and means for locking said bell cranks in position when said pins are in the ends of said slots.

4. In a bunk structure having spaced walls and including a pair of elongated transversely aligned guideways arranged inward at each end of said walls, pivot pins carried in said guideways, a fulcrum member extending from side wall to side wall of said bunk structure below and rearward of the outer ends of said guideways, and a stake assembly for each end of said bunk, each stake assembly including a bell crank lever pivotally mounted on said pivot pins at one end and pivotally supporting a stake structure medially its length at the opposite end, means including an arm for swinging said bell crank on its pivot pin and in association with said fulcrum member whereby said stake may be elevated to vertical position, and means for locking said bell crank against downward movement.

5. In combination with a logging bunk having a body including spaced walls and a longitudinally movable pivot pin, a high stake assembly for said bunk including a bell crank arm pivotally supported at one end on said movable pivot pins, said bell crank lever being provided medially with a guide pin and having a stake pivoted at its other end, means including an arm for swinging said bell crank on its pivot pin and for sliding said pin, guide members carried by said spaced side walls for engaging said guide pin during swinging movement of said bell crank, and a cross member between said side walls positioned to engage said bell crank to form a fulcrum for same during its swinging movement.

6. In combination with a logging bunk having a body including spaced side walls and longitudinally movable pivot pins, a high stake assembly for said bunk including a bell crank arm formed of spaced plates and adapted to be pivotally supported at one end on one of said movable pivot pins, said bell crank lever being provided medially with a guide pin and having a stake medially pivoted to its other end, marginal transverse stays connecting said spaced plates, means including an arm for swinging said bell crank on its pivot pin and for sliding said pin, guide members carried by said spaced side walls for engaging said guide pin during swinging movement of said bell crank, and a cross member between said side walls forming a fulcrum for said bell crank during its swinging movement.

7. In combination with logging bunk having a body including spaced side walls, a filler arranged within one end of said bunk between said spaced side walls, said filler including vertical walls abutting the side walls of said body, and a longitudinally movable pivot pin supported by said vertical walls, a high stake assembly for said bunk including a bell crank arm adapted to be pivotally supported at one end on said movable pin, a fulcrum structure supported by said bunk body, means including an arm for swinging said bell crank on said fulcrum member from a depending position with the other end of the bell crank to a position beneath said pin to an upper position with said other end of said bell crank in a vertical plane, means for retaining said bell crank in its upper position, an auxiliary stake member medially pivoted to the other end of said bell crank, and means for retaining said stake member in vertical position regardless of the position of said bell crank.

8. The substance of claim 7 characterized in that the bell crank is provided with a pocket for receiving the lower end of said stake member when the bell crank is shifted to a position with its other end in a vertical plane.

9. The substance of claim 7 characterized in that the bell crank includes a transversely extending guide pin which cooperates with guide faces extending inwardly of the bunk body.

10. The substance of claim 7 characterized in that the bell crank is so made as to provide a recess for receiving the lower end of the stake when the latter is in its elevated position.

11. The substance of claim 7 characterized in that the stake member is provided with a pocket and stop members for receiving the lower end of the stake when the latter is in its upper position, said stop members retaining said stake against swinging movement away from the bunk body.

12. The substance of claim 7 characterized in that both the bell crank and the auxiliary stake are fabricated from spaced plates, with marginal braces arranged therebetween for retaining the plates in parallel alignment.

13. In combination with logging bunk having a body including spaced walls and longitudinally movable pivot pins, a high stake assembly for said bunk including a bell crank arm adapted to be pivotally supported at one end of said movable pins, a fulcrum structure supported by said bunk body, means including an arm for swinging said bell crank on said fulcrum from suspended position with the outer end of the bell crank in a horizontal plane to an upper position with the outer end of said bell crank in a vertical plane, means for retaining said bell crank in its upper position, an auxiliary stake member pivotally mounted medially of its length to the outer end of said bell crank, and weight means for retaining said auxiliary stake in vertical position.

14. A bunk having a body portion including spaced side walls and top and bottom connecting portions, a stake arranged at the end of the bunk body of angle form, means supporting one end portion of one of the legs of the stake between the spaced side walls for downward swinging movement to a position with the outer leg of the stake in a plane beneath the bunk body, an arm forming a stake extension pivotally connected at a point adjacent its center to the outer end portion of said outer leg, means for retaining said arm in vertical alignment when the connected leg of the stake is swung to its horizontal position between said side walls, and means shiftable longitudinally of the side walls of the bunk body for swinging the stake on its pivot.

15. A bunk having a body portion including spaced side walls and top and bottom connecting portions, a main stake assembly of angle form arranged at an end of the bunk body, said stake when in its normal operating position having its outer leg in vertical position and its inner leg in a horizontal position between said side walls, means pivotally supporting the inner end portion of the inner leg of said stake between the spaced side walls for downward swinging movement to a position in which the outer leg of the stake lies in a plane beneath the bunk body, an auxiliary stake pivotally connected at a point adjacent its center to the outer end portion of said outer leg, means for retaining said auxiliary stake in vertical position and in alignment with the outer leg of the main stake when said main stake is in normal operating position, means for locking said auxiliary stake against inward folding movement when in aligned position with the outer leg of the main stake, means for maintaining said auxiliary stake in a vertical position when the outer leg of the main stake is swung on its pivot to its lower horizontal position beneath said bunk.

16. The structure of claim 15 characterized in that means are provided for securing the main stake in its upper position.

17. The structure of claim 15 characterized in that means are fixed to the side walls of the bunk for supporting association with the inner leg of the main stake to retain the same in its upper position.

18. The structure of claim 15 characterized in that the pivotal support for the inner leg of the main stake is shiftable to move said stake inwardly and longitudinally of the bunk to a position of rest upon guideways projecting from the side walls of the bunk.

19. A bunk body including spaced side walls, a main stake of angle form arranged at one end of the bunk body, said main stake in normal operating position having its inner arm substantially horizontal and pivotally associated at its inner end with said side walls, the other arm of the stake in normal operating condition being substantially vertical and positioned at the outer marginal edge portion of the bunk, means including an operating rod engaging said stake and movable longitudinally of said bunk body for releasing said stake to permit it to swing on its pivot to its lower position in which the normally vertical arm of the stake assumes a position below said pivot, a stake extension pivoted substantially medially of its length to the outer end portion of the normally vertical arm of said stake, means carried by the normally vertical arm of said main stake for securing said stake extension against inward swinging movement on its pivot when said main stake arm is in vertical position, means swinging said stake extension on its pivot to retain the same in vertical position when the normally upright arm of said stake is lowered to its horizontal position, and means securing the main stake body in its normal vertical position.

FREDERICK W. CHRISWELL.

No references cited.